United States Patent
Wang et al.

(10) Patent No.: US 9,879,971 B2
(45) Date of Patent: Jan. 30, 2018

(54) DEVICE FOR FILM THICKNESS MEASUREMENT AND METHOD FOR FILM THICKNESS MEASUREMENT

(71) Applicant: Boe Technology Group Co., Ltd., Beijing (CN)

(72) Inventors: Jinqian Wang, Beijing (CN); Lu Wang, Beijing (CN); Yujun Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/122,731

(22) PCT Filed: Sep. 15, 2015

(86) PCT No.: PCT/CN2015/089616
§ 371 (c)(1),
(2) Date: Aug. 31, 2016

(87) PCT Pub. No.: WO2016/176945
PCT Pub. Date: Nov. 10, 2016

(65) Prior Publication Data
US 2017/0074633 A1   Mar. 16, 2017

(30) Foreign Application Priority Data
May 6, 2015  (CN) .......................... 2015 1 0226235

(51) Int. Cl.
*G01B 7/06* (2006.01)
*G01B 7/16* (2006.01)
*G01B 5/06* (2006.01)

(52) U.S. Cl.
CPC ............... *G01B 7/06* (2013.01); *G01B 5/066* (2013.01); *G01B 7/085* (2013.01); *G01B 7/16* (2013.01)

(58) Field of Classification Search
USPC .......................................... 324/699, 716, 727
See application file for complete search history.

(56) References Cited

U.S. PATENT DOCUMENTS

| 2002/0021134 | A1  | 2/2002 | Stein |
| 2007/0222010 | A1* | 9/2007 | Chou ................. G06K 9/00053 257/415 |

(Continued)

FOREIGN PATENT DOCUMENTS

| CN | 102183197 | 9/2011 |
| CN | 102713501 | 10/2012 |

(Continued)

OTHER PUBLICATIONS

International Search Report and Written Opinion from PCT/CN15/089616 dated Feb. 2, 2016.

(Continued)

*Primary Examiner* — Vincent Q Nguyen
(74) *Attorney, Agent, or Firm* — Calfee, Halter & Griswold LLP

(57) ABSTRACT

A device for film thickness measurement and a method for film thickness measurement are disclosed. The device includes a planar indenter, a collecting unit and a processing unit. The planar indenter includes a base plate and a piezoelectric film layer. The collecting unit includes a plurality of collecting circuits evenly distributed above the piezoelectric film layer and spaced from each other. The collecting circuits are used for collecting current signals generated when the piezoelectric film layer deforms at positions corresponding to the collecting circuits. The processing unit is used for calculating a film thickness of the film sample to be measured based on the current signals collected by each of the collecting circuits.

14 Claims, 5 Drawing Sheets

(56) References Cited

U.S. PATENT DOCUMENTS

2007/0281373 A1    12/2007  Majhi
2012/0256371 A1*   10/2012  Woodford .............. G07D 7/164
                                                    271/265.02
2014/0191221 A1*    7/2014  Benwadih ............... G01L 9/008
                                                    257/40

FOREIGN PATENT DOCUMENTS

| CN | 103196358    | 7/2013 |
|----|--------------|--------|
| CN | 103493081    | 1/2014 |
| CN | 104390580    | 3/2015 |
| CN | 104792255    | 7/2015 |
| DE | 102011083830 | 4/2013 |
| EP | 851204       | 7/1998 |
| JP | S5560804     | 5/1980 |
| JP | H11108608    | 4/1999 |
| WO | 2014012403   | 1/2014 |

OTHER PUBLICATIONS

Office Action from China Application No. 201510226235.7 dated Mar. 9, 2017.
Second Office Action from China Application No. 201510226235.7 dated Sep. 21, 2017.

* cited by examiner

DEVICE FOR FILM THICKNESS MEASUREMENT AND METHOD FOR FILM THICKNESS MEASUREMENT

RELATED APPLICATIONS

The present application is the U.S. national phase entry of PCT/CN2015/089616, with an international filling date of Sep. 15, 2015, which claims the benefit of Chinese Patent Application No. 201510226235.7, filed on May 6, 2015, the entire disclosure of which is incorporated herein by reference.

FIELD OF THE INVENTION

The present disclosure relates to the technical field of film thickness measurement, and in particular to a device for film thickness measurement and a method for film thickness measurement.

BACKGROUND

In current film fabrication process, whether the obtained film has a uniform thickness or not is the basis for judging the performances of the film. If a single-layered film has a non-uniform thickness, not only the tensile strength and the barrier properties throughout the film, but also the subsequent processing for the film will be influenced. Thus film thickness measurement techniques are widely used in film manufacturing.

Among the existing methods for film thickness measurement, one or more detecting heads with a probe are used to perform lateral contact scanning for the surface of a film sample to be measured in a mechanical probe method (also called a step measurement method). During the scanning, the probe moves up and down with tiny peaks and valleys on the surface of the film sample to be measured, and changes in the height of the probe are converted into electrical signals by a displacement sensor, and finally the signals are recorded to draw a topography of the surface of the film sample to be measured and measure a film thickness of the film sample to be measured.

However, when the film sample is measured by using a step profiler in the step measurement method, the probe will contact the surface of the film sample to be measured. Since the probe has a small diameter, it is apt to damage the surface of the film sample to be measured when in contact therewith. Additionally, when the step profiler measures the film sample to be measured, the probe has to perform lateral contact scanning for the film sample to be measured, which is time-consuming and greatly influences the measurement efficiency.

SUMMARY

Embodiments of the invention provide a device for film thickness measurement and a method for film thickness measurement so as to alleviate or avoid the problems of damage to the surface of the sample to be measured by the probe and low measurement efficiency in measurement of the film sample by using an existing step profiler.

An embodiment of the invention provides a device for film thickness measurement, the device comprising a planar indenter, a collecting unit and a processing unit electrically connected with the collecting unit. The planar indenter comprises a base plate and a piezoelectric film layer below the base plate. The collecting unit comprises a plurality of collecting circuits evenly distributed above the piezoelectric film layer and spaced from each other, the collecting circuits being attached to the base plate. The collecting circuits are used for collecting current signals generated when the piezoelectric film layer deforms at positions corresponding to the collecting circuits. The processing unit is used for calculating a film thickness of a film sample to be measured based on the current signals collected by each of the collecting circuits.

According to an embodiment of the invention, each of the collecting circuits comprises a first electrode, a second electrode and a charge converter for converting charges into current signals. The first electrode and the charge converter are electrically connected with each other and are both attached to the base plate, and the second electrode is disposed on a surface of the piezoelectric film player opposite to the base plate.

Further, the first electrode and the charge converter may be disposed on a surface of the base plate opposite to the piezoelectric film player.

In another embodiment, each of the collecting circuits comprises a first electrode, a second electrode and a charge converter for converting charges into current signals. Each of the first electrode, the second electrode and the charge converter is disposed on a surface of the base plate opposite to the piezoelectric film player, and the first electrode and the second electrode are electrically connected with the charge converter respectively.

According to another embodiment of the invention, the first electrode and the charge converter belonging to a same one of the collecting circuits are integrated in a nanoscale chip.

According to yet another embodiment of the invention, the planar indenter further comprises a pressure transfer layer, the pressure transfer layer and the base plate may be fixed on two sides of the piezoelectric film layer.

According to still another embodiment of the invention, a plurality of pressure buffer apertures may be evenly distributed on the pressure transfer layer.

According to still another embodiment of the invention, the pressure transfer layer is made of polyimide.

In another aspect, embodiments of the invention provide a method for film thickness measurement implemented based on the device for film thickness measurement, the method may comprise the steps of pressing the planar indenter against a surface of the film sample to be measured; collecting current signals generated when the piezoelectric film layer deforms at a position corresponding to each of the collecting circuits, and calculating a film thickness of the film sample to be measured based on the current signals.

According to an embodiment of the invention, the step of calculating a film thickness of the film sample to be measured based on the current signals comprises calculating an amount of deformation generated when the piezoelectric film layer deforms at the position corresponding to each of the collecting circuits based on the current signals, and calculating the film thickness of the film sample to be measured based on the amount of deformation.

According to another embodiment of the invention, the step of calculating an amount of deformation generated when the piezoelectric film layer deforms at the position corresponding to each of the collecting circuits based on the current signals comprises acquiring, based on a preset corresponding relationship between amounts of deformation of the piezoelectric film layer and current signals generated when the piezoelectric film layer deforms, the amount of deformation generated when the piezoelectric film layer deforms at the position corresponding to each of the collecting circuits.

According to yet another embodiment of the invention, the film sample to be measured comprises a region with a film to be measured and a region without a film to be measured, and the step of calculating a film thickness of the film sample to be measured based on the amount of deformation comprises calculating a first amount of deformation generated when the piezoelectric film layer corresponding to the region with a film to be measured deforms at a position corresponding to each of the collecting circuits, calculating a second amount of deformation generated when the piezoelectric film layer corresponding to the region without a film to be measured deforms at a position corresponding to each of the collecting circuits, and calculating the film thickness of the film sample to be measured based on a difference between the first amount of deformation and the second amount of deformation.

According to still another embodiment of the invention, the step of calculating the film thickness of the film sample to be measured based on a difference between the first amount of deformation and the second amount of deformation comprises obtaining an average value of a plurality of the first amounts of deformation, obtaining an average value of a plurality of the second amounts of deformation, and calculating the film thickness of the film sample to be measured based on a difference between the average value of the plurality of the first amounts of deformation and that of the plurality of the second amounts of deformation.

When the film thickness of a film sample to be measured is measured by using the device for film thickness measurement provided in the embodiments of the invention, a planar indenter with a piezoelectric film layer is pressed against the surface of a film sample to be measured so as to contact it. Since the contact surface between the planar indenter and the film sample to be measured is far larger than that of a probe and the film sample to be measured, the planar indenter will not damage the surface of the film sample to be measured like the probe. Moreover, the device for film thickness measurement further comprises a collecting unit comprising a plurality of collecting circuits evenly distributed above the piezoelectric film layer and spaced from each other such that the device for film thickness measurement can simultaneously collect current signals generated when the piezoelectric film layer deforms at multiple positions and hence can simultaneously measure film thicknesses at the multiple positions of the film sample to be measured. It is unnecessary to perform lateral contact scanning like the existing step profiler, so a higher measurement efficiency may be achieved.

BRIEF DESCRIPTION OF DRAWINGS

In order to explain the technical solutions of the embodiments of the invention more clearly, drawings to be used in describing the embodiments shall be briefly introduced as follows. Obviously, the drawings described below are only a part of the embodiments of the invention. For a person having an ordinary skill in the art, other drawings can also be obtained based on these drawings without inventive efforts.

DETAILED DESCRIPTION OF EMBODIMENTS

In order to render the objective, technical solutions and advantages of the embodiments of the invention clearer, some implementations of the embodiments will be further described in detail in the following with reference to the drawings.

Figure 1:
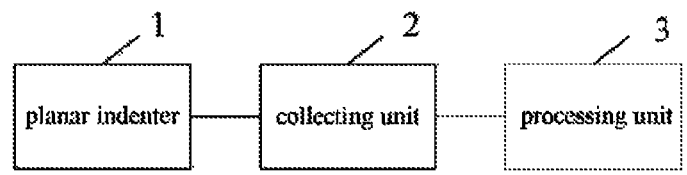
FIG. 1 is a schematic structural view of a device for film thickness measurement provided in an embodiment of the invention.

FIG. 1 provides a schematic structural view of a device for film thickness measurement according to an embodiment of the invention. Referring to FIG. 1, the device comprises a planar indenter 1, a collecting unit 2 and a processing unit 3, the processing unit 3 being electrically connected with the collecting unit 2.

Figure 2:
FIG. 2 is a schematic structural view of a planar indenter provided in an embodiment of the invention.

FIG. 2 provides a schematic structural view of a planar indenter according to an embodiment of the invention. Referring to FIG. 2, the planar indenter 1 comprises a base plate 11 and a piezoelectric film layer 12 below the base plate 11.

It should be understood that wordings mentioned herein such as "below", "beneath", "on" or "above" are intended to clearly describe the embodiments corresponding to the drawings, instead of indicating absolute positional relationships. In fact, the positional relationship between two objects described in such wordings is relative and depends on the direction in which people view them. For instance, for the example shown in FIG. 2, when viewed in a direction from the bottom of the paper to the top, the piezoelectric film layer 12 can be regarded as being below the base plate 11. But when viewed in a direction from the top of the paper to the bottom, the piezoelectric film layer 12 can also be regarded as being formed above the base plate 11.

Figure 3:
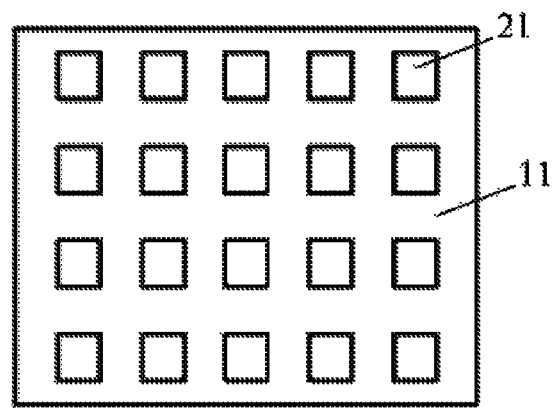
FIG. 3 is a schematic structural view of a base plate provided in an embodiment of the invention.

FIG. 3 provides a schematic structural view of a base plate which is provided with a collecting circuit according to an embodiment of the invention. In an embodiment, the collecting circuit may at least comprise a first electrode and a charge converter. The collecting unit 2 may comprise a plurality of such collecting circuits. The collecting circuits may be formed on a surface of the base plate 11 facing the piezoelectric film layer 12, so when the piezoelectric film layer 12 is combined with the base plate 11, it can be regarded that the plurality of collecting circuits are distributed on the piezoelectric film layer 12. Referring to FIG. 3, in an embodiment, the collecting unit 2 may comprise a plurality of collecting circuits 21 evenly distributed above the piezoelectric film layer 12 and spaced from each other, and the collecting circuits 21 may be attached to the base plate 11. For example, the collecting circuits may be disposed on a surface of the base plate 11 opposite to the piezoelectric film layer 12 (i.e., a surface of the base plate 11 facing the piezoelectric film layer 12).

The collecting circuits 21 are used for collecting current signals generated when the piezoelectric film layer 12 deforms at positions corresponding to the collecting circuits 21.

The processing unit 3 is used for calculating a film thickness of the film sample to be measured based on the current signals collected by the collecting circuits 21.

In an embodiment, the plurality of collecting circuits 21 may be arranged in a matrix such that the collecting circuits 21 may collect more effectively the current signals generated by deformation at each position of the piezoelectric film layer 12.

When the film thickness of a film sample to be measured is measured by using the device for film thickness measurement of this embodiment, a planar indenter with a piezoelectric film layer will contact the surface of a film sample to be measured. Since the contact surface between the planar indenter and the film sample to be measured is far larger than that of a probe and the film sample to be measured, the planar indenter will not damage the surface of the film sample to be measured like the probe. Moreover, the device for film thickness measurement further comprises a collecting unit comprising a plurality of collecting circuits evenly distributed above the piezoelectric film layer and spaced from each other, therefore, the device for film thickness measurement can simultaneously collect current signals corresponding to deformations at multiple positions of the piezoelectric film layer, and hence can simultaneously measure film thicknesses at the multiple positions of the film sample to be measured. It is unnecessary to perform lateral contact scanning like the existing step profiler, so a higher measurement efficiency may be achieved.

In this embodiment, the base plate 11 may be made of an insulating material so as to avoid interference to the current signals generated by the piezoelectric film layer 12 and hence improve accuracy of the measurement. The piezoelectric film layer 12 may be made of materials such as polyvinylidene fluoride or zinc oxide.

Figure 4:
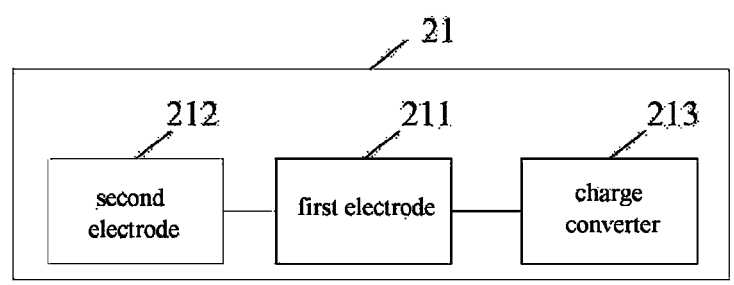
FIG. 4 is a schematic structural view of a collecting circuit provided in an embodiment of the invention.

FIG. 4 provides a schematic structural view of a collecting circuit according to an embodiment of the invention. Referring to FIG. 4, each collecting circuit 21 may comprise a first electrode 211, a second electrode 212 and a charge converter 213 for converting charges into current signals.

Figure 5:
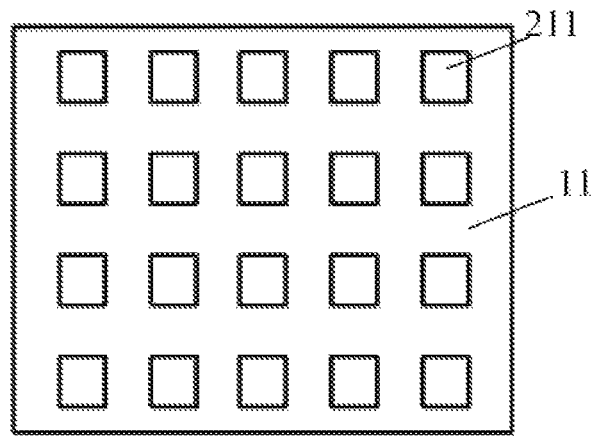
FIG. 5 is a bottom view of a base plate provided in an embodiment of the invention.

FIG. 5 provides a bottom view of a base plate according to an embodiment of the invention. Referring to FIG. 5, the first electrode 211 and the charge converter 213 (not shown in the figure) are electrically connected and are both attached to the base plate 11. For example, in the device for film thickness measurement, the first electrode 211 and the charge converter 213 may be both disposed on a surface of the base plate 11 opposite to the piezoelectric film player 12, i.e., on a surface of the base plate 11 facing the piezoelectric film player 12.

Figure 6:
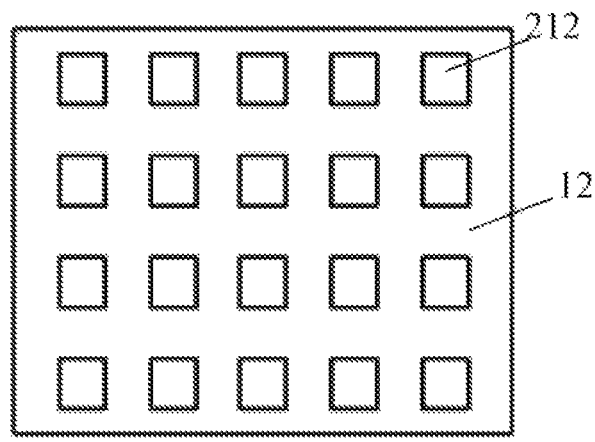
FIG. 6 is a top view of a piezoelectric film layer provided in an embodiment of the invention.

FIG. 6 provides a top view of a piezoelectric film layer according to an embodiment of the invention. Referring to FIG. 6, the second electrode 212 may be disposed on a surface of the piezoelectric film player 12 opposite to the base plate 11 (i.e., on a surface of the piezoelectric film player 12 facing the base plate 11). In this embodiment, the second electrode 212 on the piezoelectric film layer 12 may offset in position from a first electrode 211 on the base plate to avoid direct contact, and thus current signals can be generated by a potential difference between the first electrode and the second electrode. For example, the base plate may be provided with a conductive metal capable of contacting the second electrode, and the conductive metal and the first electrode can be electrically connected with the charge converter.

In an embodiment, the second electrodes 212 may be provided at all positions of the piezoelectric film layer 12 corresponding to the collecting circuits 21, therefore, deformations generated at positions of the piezoelectric film layer 12 corresponding to the collecting circuits 21 may be subjected to the same influence by the second electrodes 212. Hence, in case the film thickness of the film sample to be measured is calculated by using a difference between amounts of deformation of the piezoelectric film layer 12, the influence of the second electrodes 212 may be cancelled. Meanwhile, since the second electrodes 212 may be spaced apart on the piezoelectric film layer, they exert very little influence on the deformation of the piezoelectric film layer. Therefore, the influence of the second electrodes 212 to the measurement of film thickness of the film sample to be measured by the device for film thickness measurement is very little or even negligible.

In another embodiment, each of the collecting circuits may comprise a first electrode, a second electrode and a charge converter for converting charges into current signals. Each of the first electrode, the second electrode and the charge converter may be disposed on a surface of the base plate opposite to the piezoelectric film player, and the first electrode and the second electrode are electrically connected with the charge converter respectively. In other words, the first electrode, the second electrode and the charge converter of each collecting circuit may be arranged simultaneously on the surface of the base plate opposite to the piezoelectric film player. Likewise, current signals may be generated by a potential difference between the first electrode and the second electrode.

In an alternative embodiment, the first electrode and second electrode in each collecting circuit may be disposed on two surfaces of the piezoelectric film layer respectively, i.e., on a surface of the piezoelectric film layer opposite to the base plate and on a surface of the piezoelectric film layer away from the base plate. When the piezoelectric film layer is pressed, a potential difference may be formed between the first electrode and the second electrode, which is then provided to the charge converter for generating the current signals.

Figure 7:
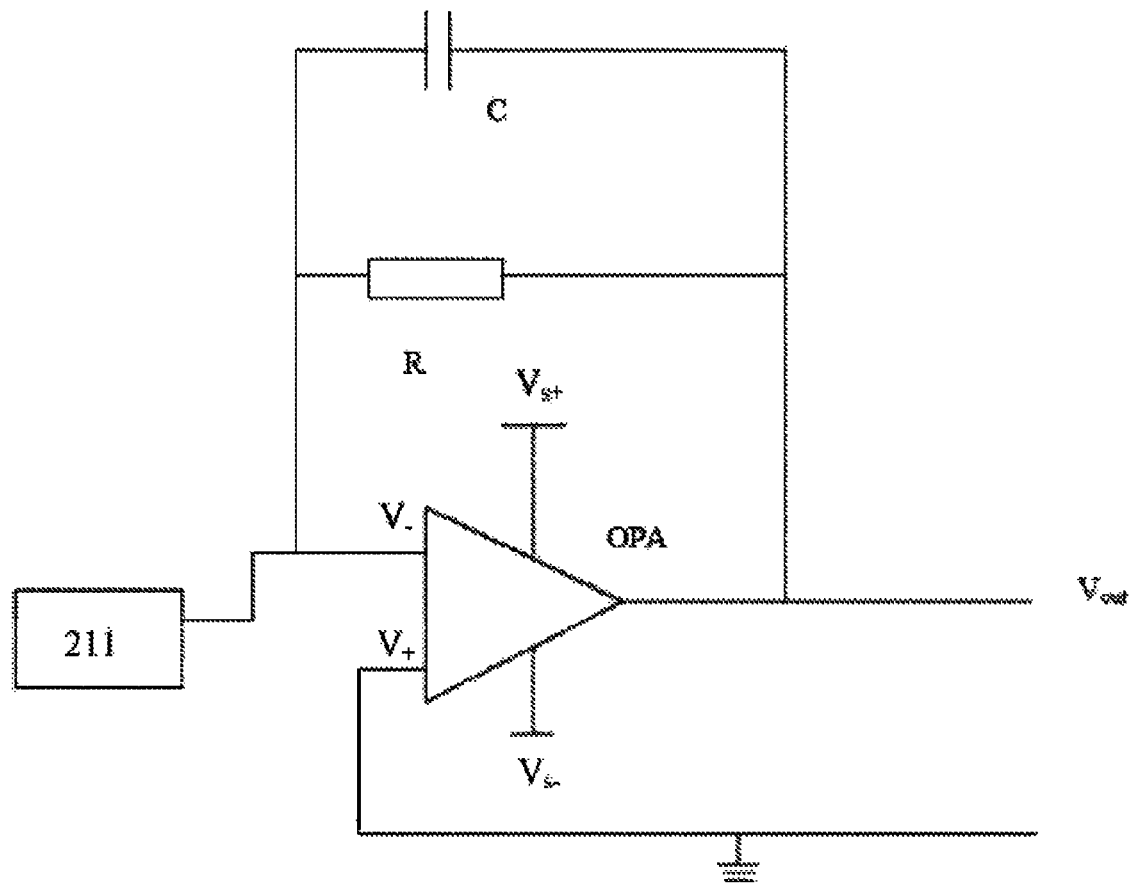
FIG. 7 is a circuit diagram of a charge converter provided in an embodiment of the invention.

FIG. 7 provides a circuit diagram of a charge converter according to an embodiment of the invention. Referring to FIG. 7, the charger converter 213 may comprise an operational amplifier ("OPA" for short), a capacitor C and a resistor R. An inverting input $V_-$ of the OPA is connected with the first electrode 211, and a non-inverting input $V_+$ of the OPA is grounded. The inverting input $V_-$ of the OPA is further electrically connected with one end of the capacitor C and one end of the resistor R respectively. The other ends of the capacitor C and the resistor R are electrically connected with an output $V_{out}$ of the OPA. A positive power supply terminal $V_{s+}$ and a negative power supply terminal $V_{s-}$ of the OPA are electrically connected with an anode and a cathode of a power supply respectively. In addition to converting charges generated by the deformation of the piezoelectric film layer 12 into current signals, the charge converter 213 may further amplify the current signals for identification by the processing unit 3.

In an embodiment, the first electrode 211 and the charge converter 213 belonging to the same collecting circuit 21 may be integrated in a nanoscale chip. In this case, the first electrode 211 of the collecting circuit 21 is in contact with the piezoelectric film layer 12. Correspondingly, the size of the second electrode 212 may also be in a nanoscale.

In this embodiment, the specification of the first electrode 211 in the collecting circuit 21 may influence the measurement accuracy of the device for film thickness measurement. When the first electrode 211 is a nanoscale electrode, the measurement accuracy of the device for film thickness measurement may be higher, and the measured values may be more accurate and more reliable.

Figure 8:
FIG. 8 is a schematic structural view of a planar indenter provided in another embodiment of the invention.

FIG. 8 provides a schematic structural view of a planar indenter according to another embodiment of the invention. Referring to FIG. 8, the planar indenter differs from the planar indenter of FIG. 2 in that it further comprises a pressure transfer layer 13, the pressure transfer layer 13 and the base plate 11 may be fixed on two sides of the piezoelectric film layer 12 respectively.

In an embodiment, the pressure transfer layer 13 and the base plate 11 may be fixed with the piezoelectric film layer 12 via an adhesive layer (not shown) which is evenly coated. The adhesive layer may be made of an epoxy adhesive (e.g., an epoxy adhesive doped with a conductive agent). In this way, the structure of the planar indenter may be made simpler without influencing the operation of the piezoelectric film layer 12.

In a situation where the pressure transfer layer 13 is absent, the amounts of deformation of the piezoelectric film layer 12 may fall within a smaller range, which may limit the film thickness that can be measured by the device for film thickness measurement. In this embodiment, by adding a pressure transfer layer 13 on one side of the piezoelectric film layer 12, when the device for film thickness measurement measures a film thickness of the film sample to be measured, the pressure transfer layer 13 contacts the surface of the film sample to be measured and deforms together with the piezoelectric film layer 12 such that the piezoelectric film layer 12 of the planar indenter may have a sufficient deformation even if the film sample to be measured is only slightly deformed, and thereby the planar indenter may be adapted to the measurement of film thickness in a larger range.

Figure 9:
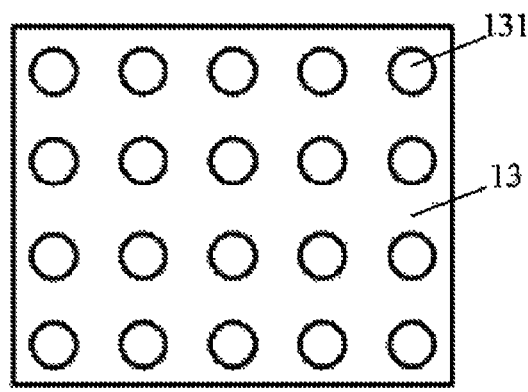
FIG. 9 is a schematic structural view of a pressure transfer layer provided in another embodiment of the invention.

FIG. 9 provides a schematic structural view of a pressure transfer layer according to an embodiment of the invention. Referring to FIG. 9, a plurality of pressure buffer apertures 131 may be evenly distributed on the pressure transfer layer 13.

In this embodiment, since the pressure transfer layer 13 is provided with a plurality of pressure buffer apertures 131 that are evenly distributed, both the deformation of the pressure transfer layer 13 and the pressure transferred to the piezoelectric film layer 12 may be more even, which in turn results in a more accurate measurement of the device for film thickness measurement.

It should be noted that the pressure transfer layer 13 in FIG. 9 is shown only for illustration, and the size of the diameter of the pressure buffer aperture 131 and the actual arrangement thereof are not limited.

In an embodiment, the pressure transfer layer 13 may be made of polyimide so as to enhance the durability of the pressure transfer layer 13.

Now the operation procedure of the device for film thickness measurement according to the embodiments of the invention will be briefly described below.

Firstly, a film sample to be measured is prepared after being preprocessed. In an embodiment, preprocessing the film sample to be measured comprises producing a region without a film in the film sample to be measured at a position adjacent to a sample portion whose film thickness will be measured, thereby forming a step.

Then, the planar indenter 1 is vertically pressed against the surface of the film sample to be measured and a film thickness of the film sample to be measured is measured under a preset measurement condition. Specifically, after the planar indenter 1 is pressed against the surface of the film sample to be measured, the piezoelectric film layer 12 generates different amounts of deformation at positions corresponding to the region with a film to be measured and the region without a film to be measured. The collecting circuit 21 collects current signals generated when the piezoelectric film layer 12 deforms at a position where the collecting circuit 21 is located. The processing unit 3 calculates a film thickness of the film sample to be measured based on the current signals collected by a plurality of collecting circuits 21 (specific calculation process may be referred to the method for film thickness measurement in the following text). In addition, the preset measurement condition may comprise the height by which the planar indenter 1 descends each time is constant, and the height of the position where the film sample to be measured is placed is constant, etc.

Finally, the planar indenter 1 is restored to an initial height, and the above procedure is repeated under the same measurement condition so as to measure film thicknesses at different positions on the surface of the film sample to be measured.

Figure 10:
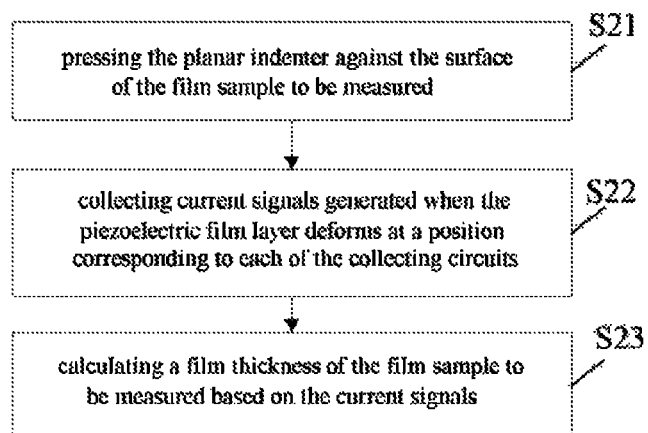
FIG. 10 is a flow chart of a method for film thickness measurement provided in an embodiment of the invention.

FIG. 10 provides a flow chart of a method for film thickness measurement according to an embodiment of the invention. The method can be implemented by a device for film thickness measurement comprising a planar indenter as shown in FIG. 2 or FIG. 8. Referring to FIG. 10, the method may comprise:

Step S21, pressing the planar indenter against the surface of the film sample to be measured.

In this embodiment, the measurement conditions for the film sample to be measured may be the same each time, for example, the height of the position where the film sample to be measured is placed is the same, and the vertical distance over which the planar indenter moves downwards each time is also the same, and the initial position from which the planar indenter moves downwards is also the same, etc.

Step S22, collecting current signals generated when the piezoelectric film layer deforms at a position corresponding to each of the collecting circuits.

Step S23, calculating a film thickness of the film sample to be measured based on the current signals.

In the embodiment, the film sample to be measured that will be measured by using the method for film thickness measurement may be preprocessed for producing a region without a film in the film sample to be measured at a position adjacent to the sample portion whose film thickness will be measured, thereby forming a step.

Figure 11:
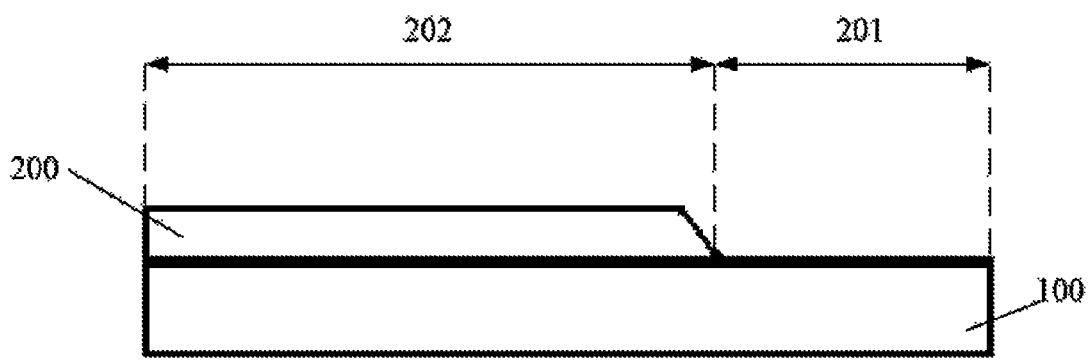
FIG. 11 is a schematic structural view of a film sample to be measured provided in an embodiment of the invention.

FIG. 11 provides a schematic structural view of a film sample to be measured according to an embodiment of the invention. Referring to FIG. 11, the film sample to be measured comprises a substrate 100 and a film to be measured 200 growing on the substrate 100. Prior to the film thickness measurement, the film sample to be measured may be preprocessed for producing a region 201 without a film in the film sample to be measured at a position adjacent to the sample portion (a region 202 with a film) whose film thickness will be measured. Accordingly, the region 201 without a film and the region 202 with a film are adjacent to each other and form a height difference which is namely the film thickness of the film to be measured. Besides, the thickness of the substrate 100 adopted for each film sample to be measured may be the same.

In actual application, mask deposition and etching can be utilized for the preprocessing, which may the same as the approach used by the step profiler for forming a step of the film sample to be measured.

Figure 12:
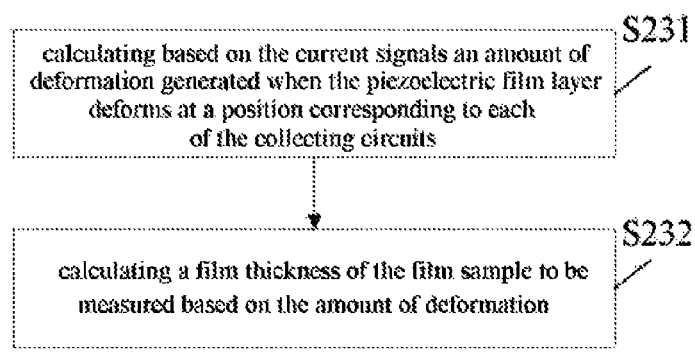
FIG. 12 is a flow chart of a method for calculating a film thickness of a film sample to be measured provided in an embodiment of the invention.

FIG. 12 provides a flow chart of a method for calculating a film thickness of a film sample to be measured according to an embodiment of the invention. Referring to FIG. 12, calculating the film thickness of the film sample to be measured based on the current signals may be implemented by means of the following steps.

S231, calculating based on the current signals an amount of deformation generated when the piezoelectric film layer deforms at a position corresponding to each of the collecting circuits.

In an embodiment, the step S231 can be implemented by acquiring, based on a preset corresponding relationship between amounts of deformation of the piezoelectric film layer and current signals generated when the piezoelectric film layer deforms, an amount of deformation generated when the piezoelectric film layer deform at a position corresponding to each of the collecting circuits.

In this embodiment, the corresponding relationship (i.e., the corresponding relationship between amounts of deformation of the piezoelectric film layer and current signals generated when the piezoelectric film layer deforms) may be obtained through a limited number of experiments under the same measurement conditions as the device for film thickness measurement. For example, firstly, providing multiple groups of film samples with known film thicknesses and pressing a planar indenter carrying a piezoelectric film layer against the surface of the film samples; then, recording current signals generated by the piezoelectric film layer under the same measurement conditions; finally, determining a corresponding relationship between current signals generated by the piezoelectric film layer and amounts of deformation of the piezoelectric film layer by means of curve fitting (the known film thicknesses are namely the amounts of deformation of the piezoelectric film layer).

Step S232, calculating a film thickness of the film sample to be measured based on the amount of deformation.

In this embodiment, referring to FIG. 11, the film sample to be measured comprises a region 202 with a film to be measured and a region 201 without a film to be measured, and the step S232 may be implemented by means of the following procedures: calculating a first amount of deformation generated when the piezoelectric film layer corresponding to the region 202 with a film to be measured deforms at a position corresponding to each of the collecting circuits, calculating a second amount of deformation generated when the piezoelectric film layer corresponding to the region 201 without a film to be measured deforms at a position corresponding to each of the collecting circuits, and calculating a film thickness of the film sample to be measured based on a difference between the first amount of deformation and the second amount of deformation.

Furthermore, calculating a film thickness of the film sample to be measured based on a difference between the first amount of deformation and the second amount of deformation may be implemented by means of the following procedures: obtaining an average value of a plurality of the first amounts of deformation, obtaining an average value of a plurality of the second amounts of deformation, and calculating a film thickness of the film sample to be measured based on a difference between the average value of the plurality of the first amounts of deformation and that of the plurality of the second amounts of deformation.

In this embodiment, by doing this, the film thickness of the film sample to be measured may be measured more accurately.

It should be noted that, for the case in which a pressure transfer layer is added below the piezoelectric film layer, the step S23 may be implemented as follows: calculating a total amount of deformation of the piezoelectric film layer and the pressure transfer layer based on the current signals, and calculating a film thickness of the film sample to be measured based on the total amount of deformation of the piezoelectric film layer and the pressure transfer layer.

Figure 13:
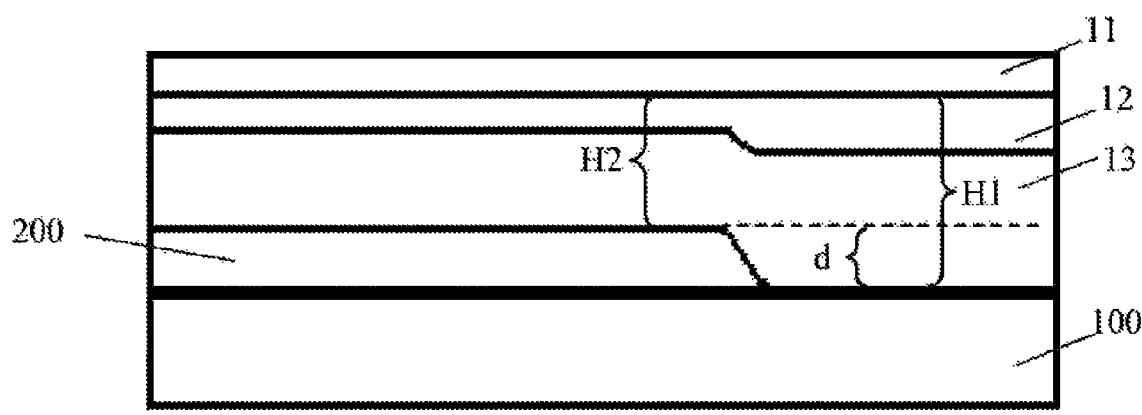
FIG. 13 is a view showing a principle of measuring a film thickness of a film sample to be measured provided in an embodiment of the invention.

FIG. 13 provides a view illustrating a principle of measuring a film thickness of a film sample to be measured according to an embodiment of the invention. Referring to FIG. 13, H1 is a total amount of deformation of the piezoelectric film layer and the pressure transfer layer corresponding to the region 201 without a film to be measured, H2 is a total amount of deformation of the piezoelectric film layer and the pressure transfer layer corresponding to the region 202 with a film to be measured, and a film thickness d of the film sample to be measured is namely a difference between H1 and H2.

In this embodiment, the corresponding relationship between the total amount of deformation of the piezoelectric film layer and the pressure transfer layer and the current signals generated by the piezoelectric film layer may be predetermined. This corresponding relationship can be obtained in the same way as the corresponding relationship between amounts of deformation of the piezoelectric film layer and current signals generated by the piezoelectric film layer, except that it is necessary to replace the piezoelectric film layer with a piezoelectric film layer and a pressure transfer layer.

What have been described above are only some embodiments of the invention and the present invention will not be limited to these. Any modification, equivalent substitution and improvement and so on made within the spirit and principle of the present invention shall fall within the protection scope of the present invention.

The invention claimed is:

1. A device for film thickness measurement comprising:
   a planar indenter;
   a collecting unit, and
   a processing unit electrically connected with the collecting unit,
   wherein the planar indenter comprises a base plate and a piezoelectric film layer below the base plate,
   the collecting unit comprises a plurality of collecting circuits evenly distributed in an array above the piezoelectric film layer and spaced from each other, the collecting circuits being attached to the base plate,
   wherein the collecting circuits collect current signals generated when the piezoelectric film layer deforms at positions corresponding to the collecting circuits,
   wherein the processing unit calculates a film thickness of a film sample to be measured based on the current signals collected by each of the collecting circuits,
   wherein the planar indenter is used for being pressed against the film sample to be measured in such a way that the piezoelectric film layer is aligned with the film sample to be measured, so as to perform film thickness measurement.

2. The device according to claim 1, wherein each of the collecting circuits comprises a first electrode, a second electrode and a charge converter that converts charges into current signals, wherein the first electrode and the charge converter are electrically connected with each other and are both attached to the base plate, and the second electrode is disposed on a surface of the piezoelectric film player opposite to the base plate.

3. The device according to claim 2, wherein the first electrode and the charge converter are disposed on a surface of the base plate opposite to the piezoelectric film player.

4. The device according to claim 1, wherein each of the collecting circuits (comprises a first electrode, a second electrode and a charge converter for converting charges into current signals, wherein each of the first electrode, the second electrode and the charge converter is disposed on a surface of the base plate opposite to the piezoelectric film player, and the first electrode and the second electrode are electrically connected with the charge converter.

5. The device according to claim 2, wherein the first electrode and the charge converter belonging to a same one of the collecting circuits are integrated in a nanoscale chip.

6. The device according to claim 1, wherein the planar indenter further comprises a pressure transfer layer, and the pressure transfer layer and the base plate are fixed on two sides of the piezoelectric film layer.

7. The device according to claim 6, wherein a plurality of pressure buffer apertures are evenly distributed on the pressure transfer layer.

8. The device according to claim 7, wherein the pressure transfer layer is made of polyimide.

9. A method for film thickness measurement comprising:
implementing a device for film thickness measurement comprising:
a planar indenter;
a collecting unit, and
a processing unit electrically connected with the collecting unit,
wherein the planar indenter comprises a base plate and a piezoelectric film layer below the base plate,
wherein the collecting unit comprises a plurality of collecting circuits evenly distributed in an array above the piezoelectric film layer and spaced from each other, the collecting circuits being attached to the base plate,
pressing the planar indenter against a surface of the film sample to be measured;
using the collecting circuits to collect current signals generated when the piezoelectric film layer deforms at a position corresponding to each of the collecting circuits, and
using the processing unit to calculate a film thickness of the film sample to be measured based on the current signals collected by each of the collecting circuits,
wherein the planar indenter is used for being pressed against the film sample to be measured in such a way that the piezoelectric film layer is aligned with the film sample to be measured, so as to perform film thickness measurement.

10. The method according to claim 9, wherein the step of calculating a film thickness of the film sample to be measured based on the current signals comprises:
calculating an amount of deformation generated when the piezoelectric film layer deforms at the position corresponding to each of the collecting circuits based on the current signals, and
calculating the film thickness of the film sample to be measured based on the amount of deformation.

11. The method according to claim 10, wherein the step of calculating an amount of deformation generated when the piezoelectric film layer deforms at the position corresponding to each of the collecting circuits based on the current signals comprises acquiring, based on a preset corresponding relationship between amounts of deformation of the piezoelectric film layer and current signals generated when the piezoelectric film layer deforms, the amount of deformation generated when the piezoelectric film layer deforms at the position corresponding to each of the collecting circuits.

12. The method according to claim 10, wherein the film sample to be measured comprises a region with a film to be measured and a region without a film to be measured, and the step of calculating a film thickness of the film sample to be measured based on the amount of deformation comprises:
calculating a first amount of deformation generated when the piezoelectric film layer corresponding to the region with a film to be measured deforms at a position corresponding to each of the collecting circuits;
calculating a second amount of deformation generated when the piezoelectric film layer corresponding to the region without a film to be measured deforms at a position corresponding to each of the collecting circuits,
and calculating the film thickness of the film sample to be measured based on a difference between the first amount of deformation and the second amount of deformation.

13. The method according to claim 12, wherein the step of calculating the film thickness of the film sample to be measured based on a difference between the first amount of deformation and the second amount of deformation comprises:
obtaining an average value of a plurality of the first amounts of deformation;
obtaining an average value of a plurality of the second amounts of deformation;
calculating the film thickness of the film sample to be measured based on a difference between the average value of the plurality of the first amounts of deformation and that of the plurality of the second amounts of deformation.

14. The device according to claim 4, wherein the first electrode and the charge converter belonging to a same one of the collecting circuits are integrated in a nanoscale chip.

* * * * *